United States Patent
Ram Bhuyan et al.

(10) Patent No.: US 10,643,224 B2
(45) Date of Patent: May 5, 2020

(54) ANALYZING EVENT-ASSOCIATED CONNECTIONS

(71) Applicant: Accenture Global Solutions Limited, Dublin (IE)

(72) Inventors: Mukunda Ram Bhuyan, Bangalore (IN); Subhasish Roy, Bangalore (IN); Bibin George Thottikkara, Bangalore (IN); Sudipta Mukhopadyaya, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 260 days.

(21) Appl. No.: 15/657,884

(22) Filed: Jul. 24, 2017

(65) Prior Publication Data

US 2019/0026758 A1 Jan. 24, 2019

(51) Int. Cl.
*G06Q 30/00* (2012.01)
*G06Q 30/02* (2012.01)
*G06Q 50/00* (2012.01)
*G06N 20/00* (2019.01)

(52) U.S. Cl.
CPC ......... *G06Q 30/0201* (2013.01); *G06N 20/00* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 2003/0227479 A1* | 12/2003 | Mizrahi | A63F 13/10 715/753 |
| 2010/0114673 A1 | 5/2010 | Briggs et al. | |
| 2011/0276396 A1 | 11/2011 | Rathod et al. | |
| 2011/0320536 A1 | 12/2011 | Lobb et al. | |
| 2012/0246266 A1 | 9/2012 | Mallet et al. | |
| 2014/0207665 A1 | 7/2014 | Dunwoody | |
| 2014/0249822 A1 | 9/2014 | Baldwin et al. | |
| 2015/0058324 A1* | 2/2015 | Kauwe | G06F 16/24575 707/722 |

(Continued)

FOREIGN PATENT DOCUMENTS

| | | | | |
|---|---|---|---|---|
| EP | 326778 A2 * | 6/1988 | | G06F 15/21 |
| WO | WO-9706499 A1 * | 2/1997 | | G06F 19/3418 |
| WO | WO-2010006062 A1 * | 1/2010 | | G06Q 30/02 |

OTHER PUBLICATIONS

EVENTMB Studio Team. Swapcard: Matchmaking Powered by Artificial Intelligence. (May 3, 2017). Retrieved online Feb. 7, 2020. https://www.eventmanagerblog.com/swapcard-review (Year: 2017).*

(Continued)

*Primary Examiner* — James A Reagan
(74) *Attorney, Agent, or Firm* — Harrity & Harrity, LLP (57) ABSTRACT

A device may receive information related to connections between two or more attendees of an event or subsequent interactions between the two or more attendees. The device may process the information using a set of techniques to permit an analysis of the connections and the subsequent interactions. The device may determine a score related to the event based on a result of analyzing the connections and the subsequent interactions. The score may indicate a level of success of the event with respect to the connections or the subsequent interactions. The device may perform an action based on the score.

20 Claims, 7 Drawing Sheets

(56) References Cited

U.S. PATENT DOCUMENTS

2016/0055236 A1* 2/2016 Frank ............... G06F 40/295
 707/748
2016/0224803 A1* 8/2016 Frank ............... G06F 16/24578
2017/0249651 A1* 8/2017 Pulitzer ............ H04W 4/21

OTHER PUBLICATIONS

Hattie et al. The Power of Feedback. (Mar. 2007). Retrieved online Feb. 7, 2020. http://www.columbia.edu/~mvp19/ETF/Feedback.pdf (Year: 2007).*

Liu, Bing. Sentiment Analysis and Opinion Mining. (Apr. 22, 2012). Retrieved online Feb. 7, 2020. https://www.cs.uic.edu/~liub/FBS/SentimentAnalysis-and-OpinionMining.pdf (Year: 2012).*

1Card, "1Card builds connections. Quickly," http://www.1card.in/, 2017, 9 pages.

* cited by examiner

ANALYZING EVENT-ASSOCIATED CONNECTIONS

BACKGROUND

Networking (e.g., business networking) may include an activity by which employees, entrepreneurs, industry professionals, and/or the like meet to form relationships and/or to recognize, create, or act upon opportunities. In addition, networking may facilitate the sharing of information and/or the identifying of potential partners for ventures. Individuals may develop a social network through networking to facilitate connections with other individuals, such as to further each other's interests.

SUMMARY

According to some possible implementations, a device may include one or more processors to receive information related to connections between two or more attendees of an event or subsequent interactions between the two or more attendees after the event. The information may include contact information associated with the two or more attendees. The one or more processors may process the information using a set of techniques to identify the connections or the subsequent interactions. The set of techniques may include a text processing technique, or an audio data processing technique. The one or more processors may determine a score related to the event based on the connections or the subsequent interactions associated with the two or more attendees of the event. The score may indicate a level of success of the event. The one or more processors may perform an action related to the event based on the score.

According to some possible implementations, a method may include receiving, by a device, information related to an event. The information may relate to connections between two or more attendees of the event that exchanged contact information at the event, or subsequent interactions between the two or more attendees after exchanging the contact information. The method may include processing, by the device, the information using a set of techniques to identify the connections or the subsequent interactions. The method may include determining, by the device, a score related to the event that indicates a level of success of the event with respect to the connections or the subsequent interactions. The score may be determined using the information related to the connections or the subsequent interactions. The method may include performing, by the device, an action related to the event based on the score.

According to some possible implementations, a non-transitory computer-readable medium may store one or more instructions that, when executed by one or more processors, cause the one or more processors to receive information related to connections between two or more attendees of an event or subsequent interactions between the two or more attendees. The information may be received from a client device associated with one of the two or more attendees, or a server device. The one or more instructions, when executed by the one or more processors, may cause the one or more processors to process the information using a set of techniques to permit an analysis of the connections and the subsequent interactions. The one or more instructions, when executed by the one or more processors, may cause the one or more processors to determine a score related to the event based on a result of analyzing the connections and the subsequent interactions. The score may indicate a level of success of the event with respect to the connections or the subsequent interactions. The one or more instructions, when executed by the one or more processors, may cause the one or more processors to perform an action based on the score.

DETAILED DESCRIPTION

The following detailed description of example implementations refers to the accompanying drawings. The same reference numbers in different drawings may identify the same or similar elements.

An organization may send employees to conferences, networking events, and/or the like. These types of events often cause an employee to be absent from work during work time and/or may cost the organization hundreds or thousands of dollars per employee that attends. As such, assessing the effectiveness and/or value of such events is an important aspect for determining whether to send employees to future events, determining similar types of events to host in the future, and/or the like. The organization may lack a computer-based technique to objectively process data related to such events to determine whether sending employees to such events is effective (e.g., successful in generating customer and/or partner leads), to identify characteristics of such events that cause one event to be more effective than another event, and/or the like.

Some implementations, described herein, provide a networking analysis platform that is capable of automatically processing data related to connections made among attendees of an event. In this way, the networking analysis platform may determine a level of success of the event with respect to generating connections among attendees of the event, generating potential customer or partner leads among attendees of the event, and/or the like. This conserves processing resources by increasing an efficiency of processing data related to an event to determine the level of success of the event relative to using other processing resources that cannot process the data as efficiently. In addition, this improves an accuracy of assessing a level of success of an event relative to using another technique, such as a manual assessment, merely relying on statements from employees that attended the event to determine a level of success of the event, and/or the like.

Figure 1A:
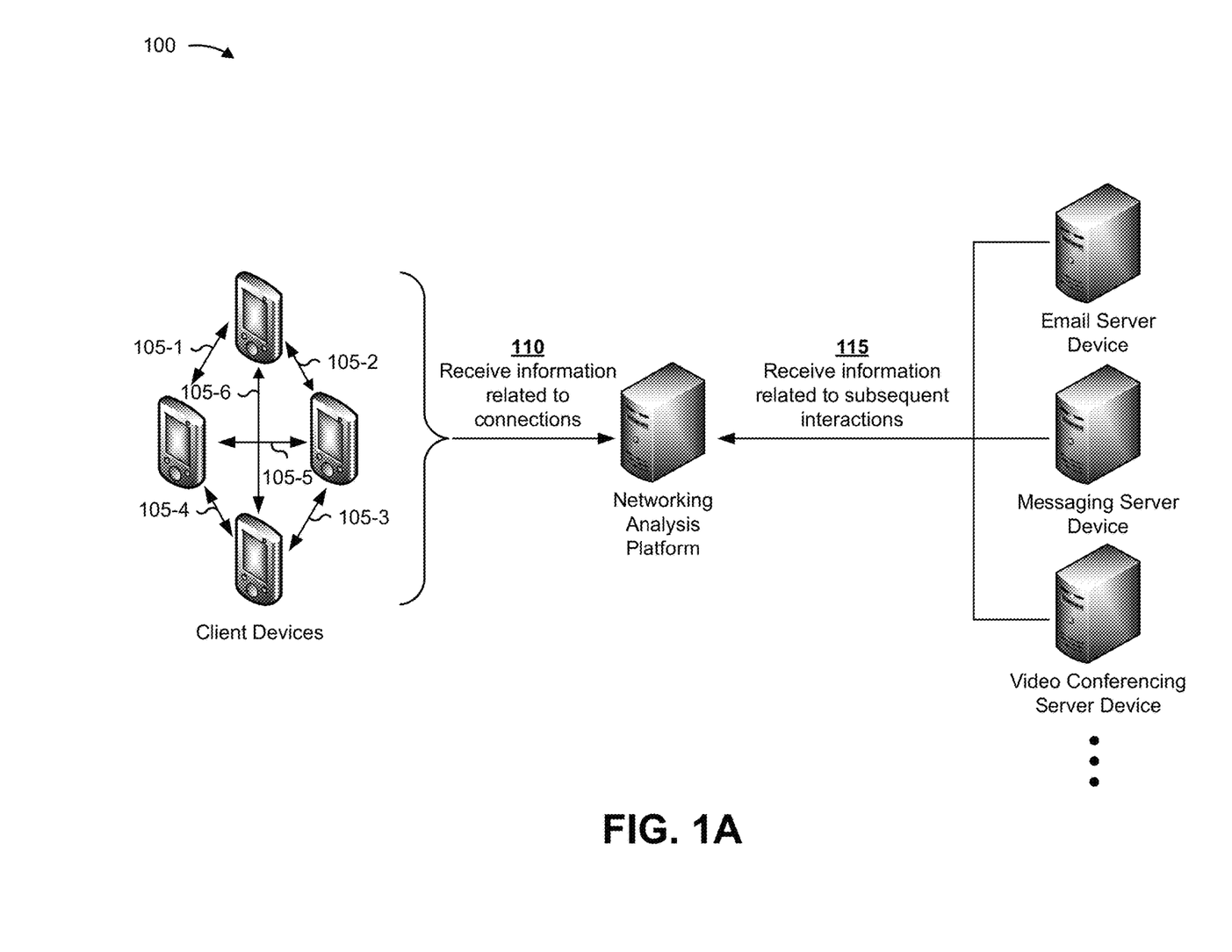
FIGS. 1A-1C are diagrams of an overview of an example implementation described herein.
Figure 1B:
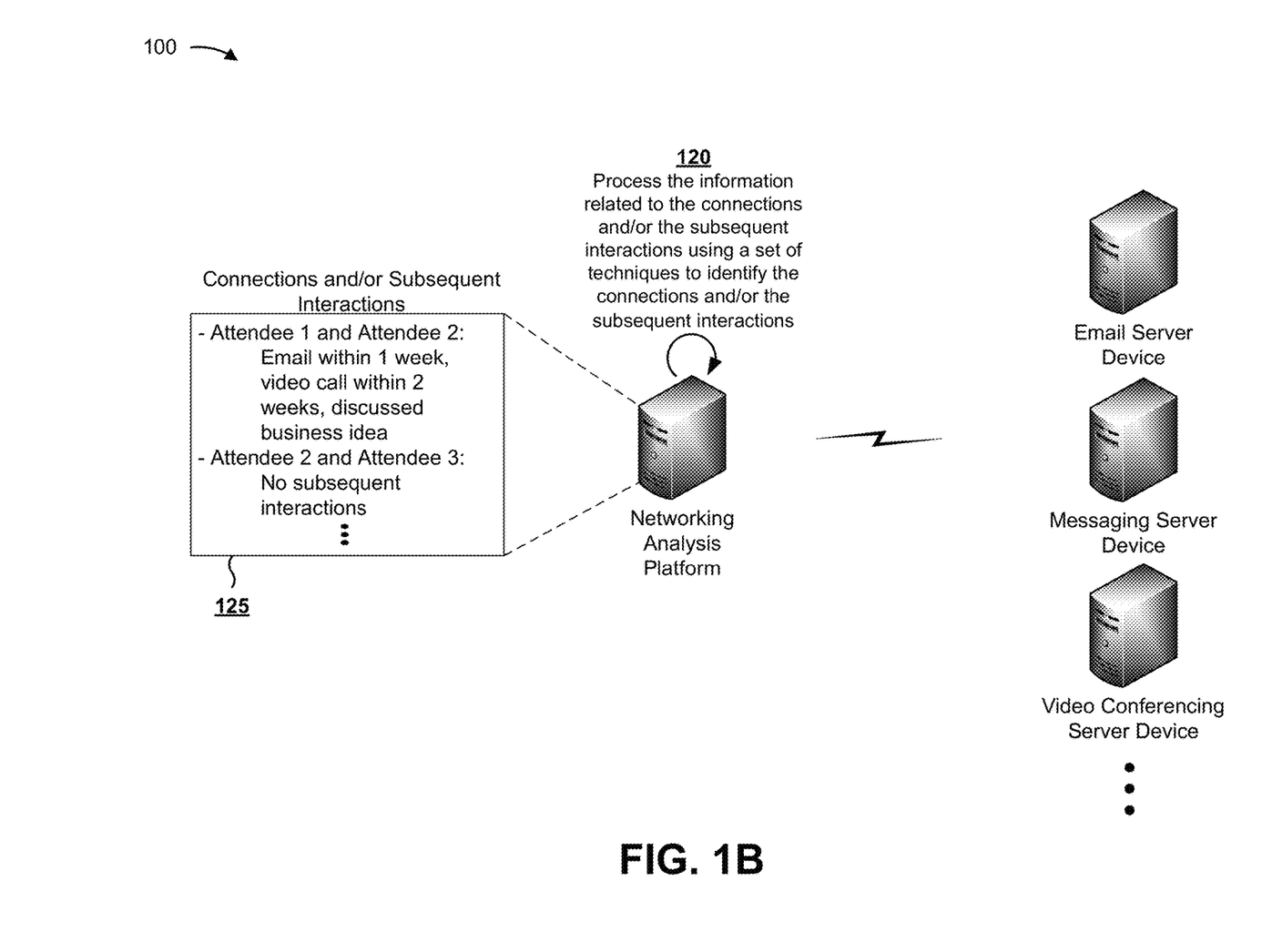
Figure 1C:
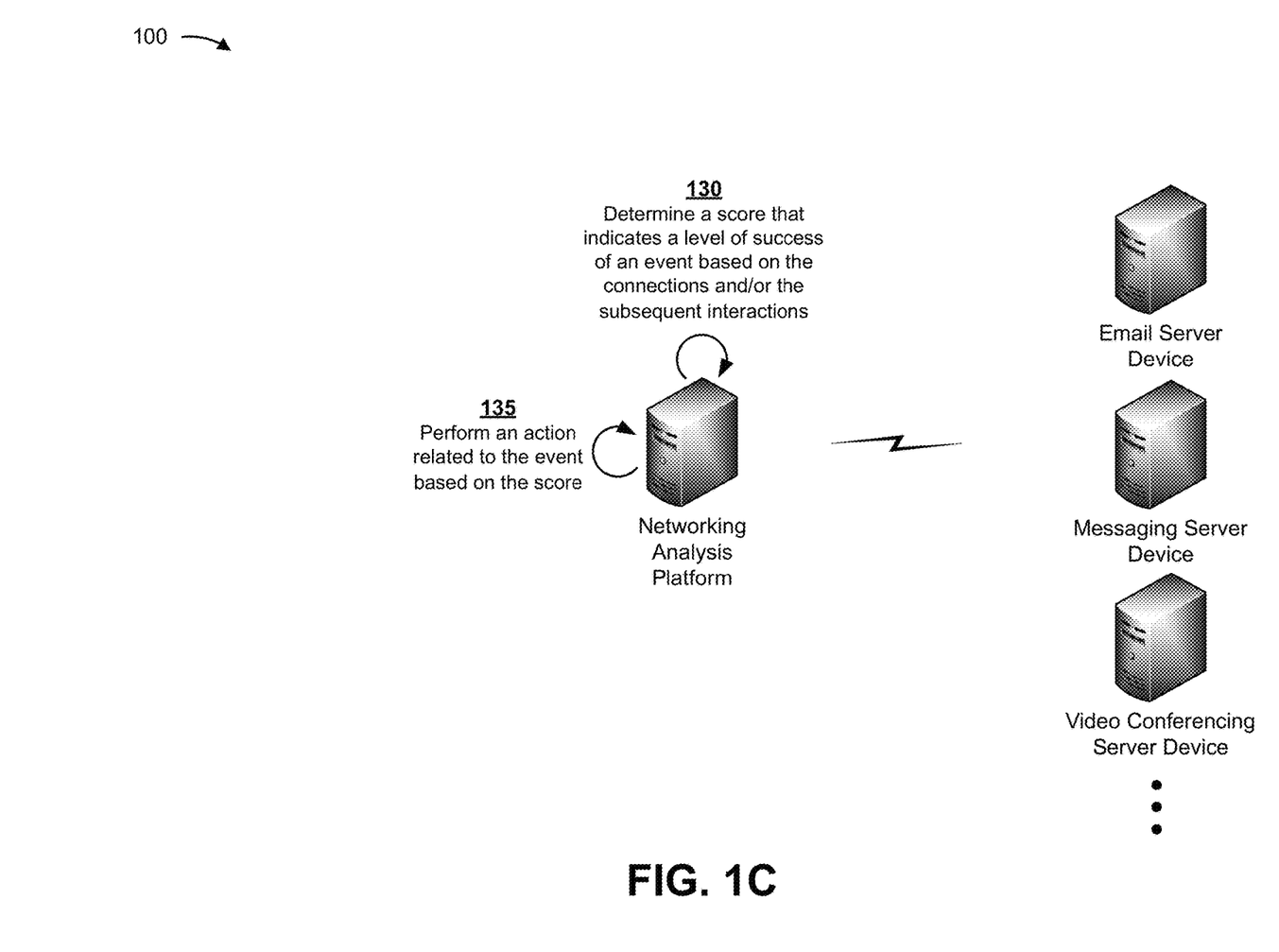

FIGS. 1A-1C are diagrams of an overview of an example implementation 100 described herein. For illustration, example implementation 100 includes a set of client devices, a networking analysis platform, and a set of server devices (e.g., shown as an email server device, a messaging server device, a video conferencing server device, etc.). In practice, there may be hundreds, thousands, or millions of client devices and/or server devices in communication with the networking analysis platform.

As shown in FIG. 1A, and as shown by reference numbers 105-1 through 105-6, a set of client devices may exchange contact information for a set of users associated with the set of client devices (e.g., a set of users who are attending an event such as a networking event, a conference, etc.). For example, the contact information may include information identifying a name, a phone number, an employer, an email address, a job title, and/or the like for a user associated with a client device.

In some implementations, the set of client devices may exchange the contact information using a set of techniques. For example, the set of client devices may exchange the contact information using near field communication (NFC). Continuing with the previous example, users of two client devices may position the two client devices within a threshold distance and may perform a gesture on screens associated with the two client devices (e.g., a swipe, a selection of a button, etc.) to cause the two client devices to exchange contact information.

Additionally, or alternatively, and as another example, the set of client devices may exchange contact information using a chat bot to send a message from one client device to another client device. Continuing with the previous example, a user of a first client device may use a chat bot to gather contact information from the first client device, convert the contact information to a particular file format (e.g., a graphics interchange format (GIF), a portable network graphics (PNG) format, a text file, etc.), and may provide the contact information to a second client device (e.g., via a text message, an email, etc.). A user of the second client device may accept or reject the contact information after the second client device provides a notification for display indicating that the second client device has received contact information from the first client device.

Additionally, or alternatively, and as another example, the set of client devices may exchange contact information by sending a link from a first client device to a second client device, where selection of the link by a user of the second client device causes the second client device to download the contact information. Continuing with the previous example, the user of the first client device may provide contact information related to a user of the first client device for display so that the user can select which contact information is to be provided to the second client device. Continuing still with the previous example, the first client device may generate and send a link to the second client device to permit the second client device to download the selected contact information.

Additionally, or alternatively, the set of client devices may exchange contact information by exchanging messages (e.g., emails, text messages, etc.). For example, a first client device may provide contact information to a second client device by sending an email or a text message to the second client device that includes the contact information.

As further shown in FIG. 1A, and as shown by reference number 110, the networking analysis platform may receive information related to connections formed at an event (e.g., from the set of client devices). For example, the networking analysis platform may receive information that identifies which client devices exchanged contact information at the event, whether client devices that exchanged contact information have previously exchanged contact information, and/or the like. In some implementations, the networking analysis platform may receive hundreds, thousands, millions, etc. of data elements when receiving information related to connections formed at an event. Additionally, or alternatively, the networking analysis platform may receive data elements for multiple events (e.g., that are occurring simultaneously, that occur during a time period, etc.). In this way, the networking analysis platform may receive a data set that cannot be processed manually or objectively by a human actor.

As further shown in FIG. 1A, and as shown by reference number 115, the networking analysis platform may receive information related to subsequent interactions of attendees of an event. For example, the networking analysis platform may receive information that identifies whether users of client devices that exchanged contact information have subsequent interactions after the event. Continuing with the previous example, the information may identify whether the users have used client devices to connect on social media, to exchange emails, to exchange instant messages, to have a telephone conversation, to have a video call/conference, and/or the like. Additionally, or alternatively, the networking analysis platform may receive information related to the content of any subsequent interactions (e.g., text of an email, audio of a telephone call and/or video call, etc.). In some implementations, the networking analysis platform may receive hundreds, thousands, millions, etc. of data elements when receiving information related to subsequent interactions of attendees of an event. In this way, the networking analysis platform may receive a data set that cannot be processed manually or objectively by a human actor.

In some implementations, the networking analysis platform may receive information that identifies attendees of an event to permit an analysis related to the attendees. For example, the networking analysis platform may receive information that identifies registered attendees for an event, attendees that check in at an event, and/or the like. In some implementations, the networking analysis platform may receive the information identifying the attendees from a device associated with an organization hosting the event, based on input from a user of a client device indicating that the user attended the event and/or identifying a list of attendees, and/or the like.

In some implementations, the networking analysis platform may be associated with an organization. In some implementations the networking analysis platform may receive information related to connections and/or subsequent interactions from client devices and/or server devices associated with the organization (e.g., via software installed on the client devices and/or the server devices). Additionally, or alternatively, the networking analysis platform may receive the information related to connections and/or subsequent interactions from client devices and/or server devices not associated with the organization when users of those devices opt in to providing that information.

As shown in FIG. 1B, and as shown by reference number 120, the networking analysis platform may process the information related to the connections and/or the subsequent interactions using a set of techniques to identify the connections and/or the subsequent interactions. For example, the networking analysis platform may process text using a natural language processing technique, a text analysis technique, a computational linguistics technique, and/or the like. Additionally, or alternatively, and as another example, the networking analysis platform may use a speech-to-text technique, a computer speech recognition technique, an automatic speech recognition technique, and/or the like to process audio data. In some implementations, the networking analysis platform may process the information to identify which client devices have exchanged contact information, to identify whether users have had subsequent interactions after exchanging contact information, to identify the content of the subsequent interactions (e.g., whether the subsequent interactions were social, professional, etc.), and/or the like.

As further shown in FIG. 1B, reference number 125 shows examples of connections and/or subsequent interactions that the networking analysis platform may identify by processing the information related to the connections and/or the subsequent interactions. For example, as shown, the networking analysis platform may identify that client devices associated with attendee 1 and attendee 2 exchanged contact information at the event and that client devices associated with attendee 1 and attendee 2 exchanged a set of emails within 1 week of the event, connected for a video call within 2 weeks of the event, and that the content of these subsequent interactions related to a business idea. As another example, and as further shown by reference number 125, the networking analysis platform may identify that client devices associated with attendee 2 and attendee 3 exchanged contact information and that attendee 2 and attendee 3 did not have any subsequent interactions after the event.

As shown in FIG. 1C, and as shown by reference number 130, the networking analysis platform may determine a score that indicates a level of success of an event based on the connections and/or the subsequent interactions of attendees of the event. For example, the networking analysis platform may determine a score based on whether client devices that exchange contact information at the event have previously exchanged contact information (e.g., at a previous event), whether users of the client devices have subsequent interactions, a nature of the subsequent interactions, and/or the like. In some implementations, the score may indicate a level of success of the event. For example, the score may indicate whether the event results in attendees connecting with each other, whether the event results in potential customer or partner leads for attendees of the event, whether attendees are pursuing connections formed at the event, and/or the like.

As further shown in FIG. 1C, and as shown by reference number 135, the networking analysis platform may perform an action related to the event based on the score. For example, the networking analysis platform may identify events that have a threshold level of success (e.g., based on having a threshold score). Additionally, or alternatively, and as another example, the networking analysis platform may identify individuals who contribute to a successful event (e.g., an attendee that contacts other attendees with which the attendee exchanged contact information at the event).

Additionally, or alternatively, and as another example, the networking analysis platform may process information related to the event using machine learning or artificial intelligence such as to identify characteristics of events that contribute to the event having a threshold level of success (e.g., a high level of success, a low level of success, an unsuccessful level of success, etc.), characteristics of attendees that contribute to the event being an effective event, future events that may have a threshold level of success, and/or the like. Additionally, or alternatively, and as another example, the networking analysis platform may provide information, for display, to a client device (e.g., associated with a manager of an attendee) that identifies a score related to the event, connections resulting from the event, subsequent interactions of attendees of the event, and/or the like.

In this way, the networking analysis platform may determine a level of success of the event with respect to generating connections among attendees of the event, generating potential customer or partner leads among attendees of the event, and/or the like. This conserves processing resources by increasing an efficiency of processing data related to an event to determine the level of success of the event relative to using other processing resources that cannot process the data as efficiently. In addition, this improves an accuracy of assessing a level of success of an event relative to using another technique, such as a manual assessment, merely relying on statements from employees that attended the event to determine a level of success of the event, and/or the like.

As indicated above, FIGS. 1A-1C are provided merely as an example. Other examples are possible and may differ from what was described with regard to FIGS. 1A-1C.

Figure 2:
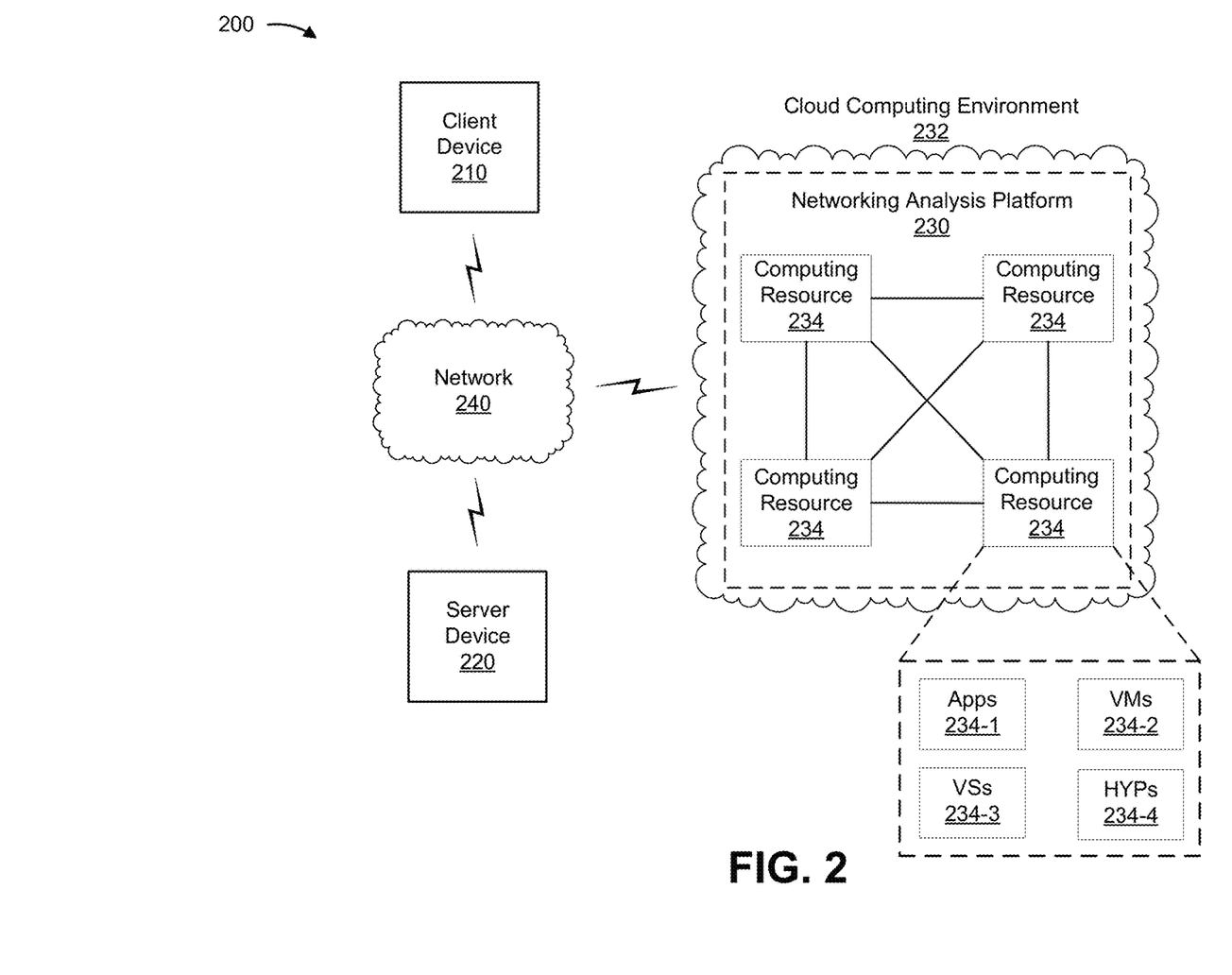
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a networking analysis platform 230 provided within a cloud computing environment 232 that includes a set of computing resources 234, and a network 240. Devices of environment 200 may interconnect via wired connections, wireless connections, or a combination of wired and wireless connections.

Client device 210 includes one or more devices capable of receiving, generating, storing, processing, and/or providing information associated with an event, attendees of the event, subsequent interactions of attendees of the event, and/or the like. For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, client device 210 may provide data related to a user of client device 210, other client devices 210 with which client device 210 exchanged contact information, and/or the like, as described elsewhere herein. Additionally, or alternatively, client device 210 may receive information identifying a result of an analysis performed by networking analysis platform 230 (e.g., to be provided for display), as described elsewhere herein. While a single client device 210 is shown in FIG. 2, in practice, there can be hundreds, thousands, millions, etc. of client devices 210 in communication with networking analysis platform 230.

Server device 220 includes one or more devices capable of receiving, generating, storing, processing, and/or providing information associated with an event, attendees of the event, subsequent interactions of attendees of the event, and/or the like. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide, to networking analysis platform 230, information to be used by networking analysis platform 230 to analyze an event, as described elsewhere herein. Additionally, or alternatively, server device 220 may store information related to a result of an analysis performed by networking analysis platform 230 (e.g., to facilitate machine learning to improve future analyses of an event and/or analyses by other networking analysis platforms 230), as described elsewhere herein. While a single server device 220 is shown in FIG. 2, in practice, there can be hundreds, thousands, millions, etc. of server devices 220 in communication with networking analysis platform 230.

Networking analysis platform 230 includes one or more devices capable of automatically analyzing information associated with an event, attendees of the event, subsequent interactions of attendees of the event, and/or the like to determine a level of success of the event. For example, networking analysis platform 230 may include a cloud server or a group of cloud servers. In some implementations, networking analysis platform 230 may be designed to be modular such that certain software components can be swapped in or out depending on a particular need. As such, networking analysis platform 230 may be easily and/or quickly reconfigured for different uses.

In some implementations, as shown in FIG. 2, networking analysis platform 230 may be hosted in cloud computing environment 232. Notably, while implementations described herein describe networking analysis platform 230 as being hosted in cloud computing environment 232, in some implementations, networking analysis platform 230 may not be cloud-based (i.e., may be implemented outside of a cloud computing environment) or may be partially cloud-based.

Cloud computing environment 232 includes an environment that hosts networking analysis platform 230. Cloud computing environment 232 may provide computation, software, data access, storage, and/or other services that do not require end-user knowledge of a physical location and configuration of a system and/or a device that hosts networking analysis platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host networking analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, and/or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with networking analysis platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210, an operator of networking analysis platform 230, an organization associated with networking analysis platform 230, etc.), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
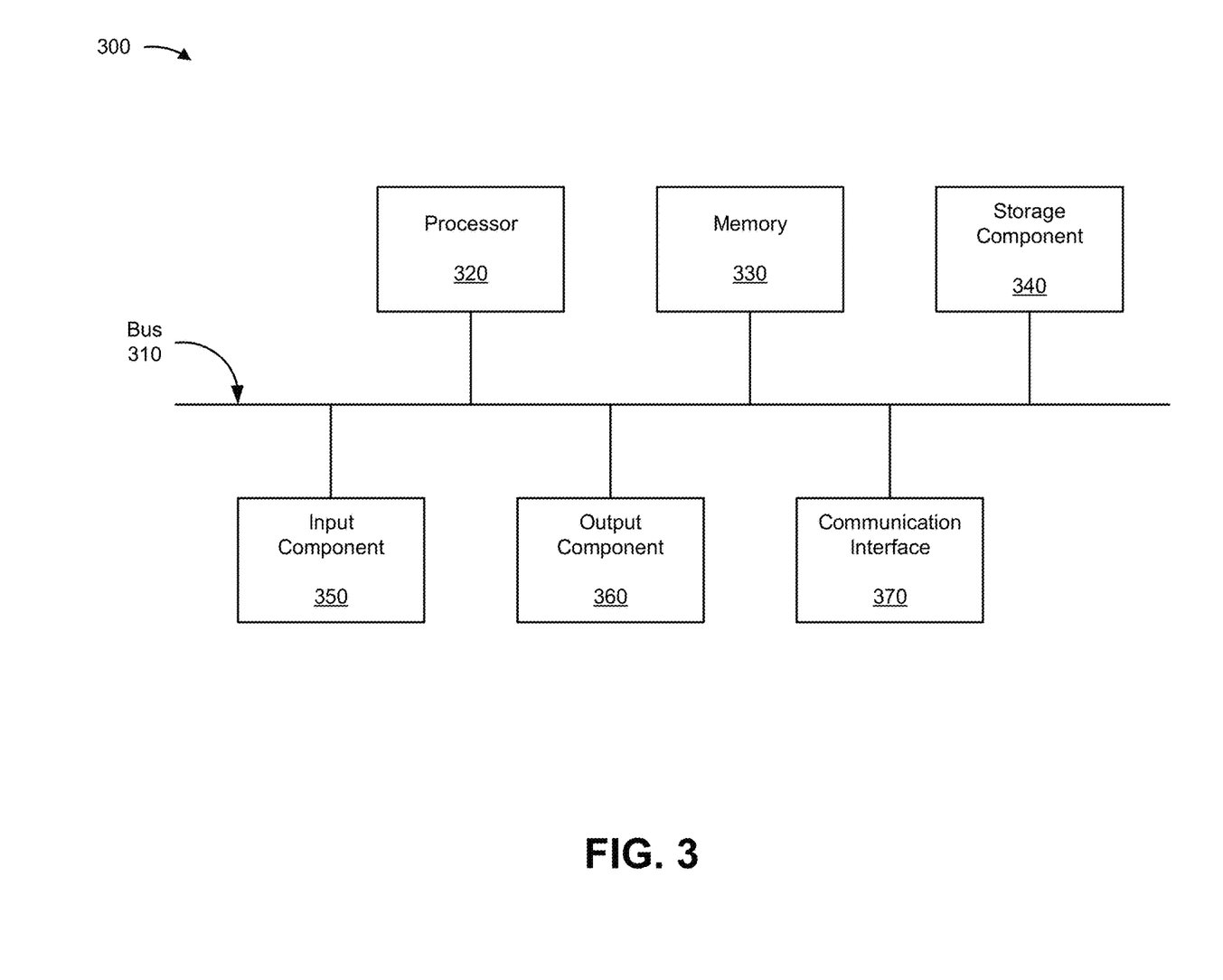
FIG. 3 is a diagram of example components of one or more devices of FIG. 2.

FIG. 3 is a diagram of example components of a device 300. Device 300 may correspond to client device 210, server device 220, networking analysis platform 230, and/or computing resource 234. In some implementations, client device 210, server device 220, networking analysis platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
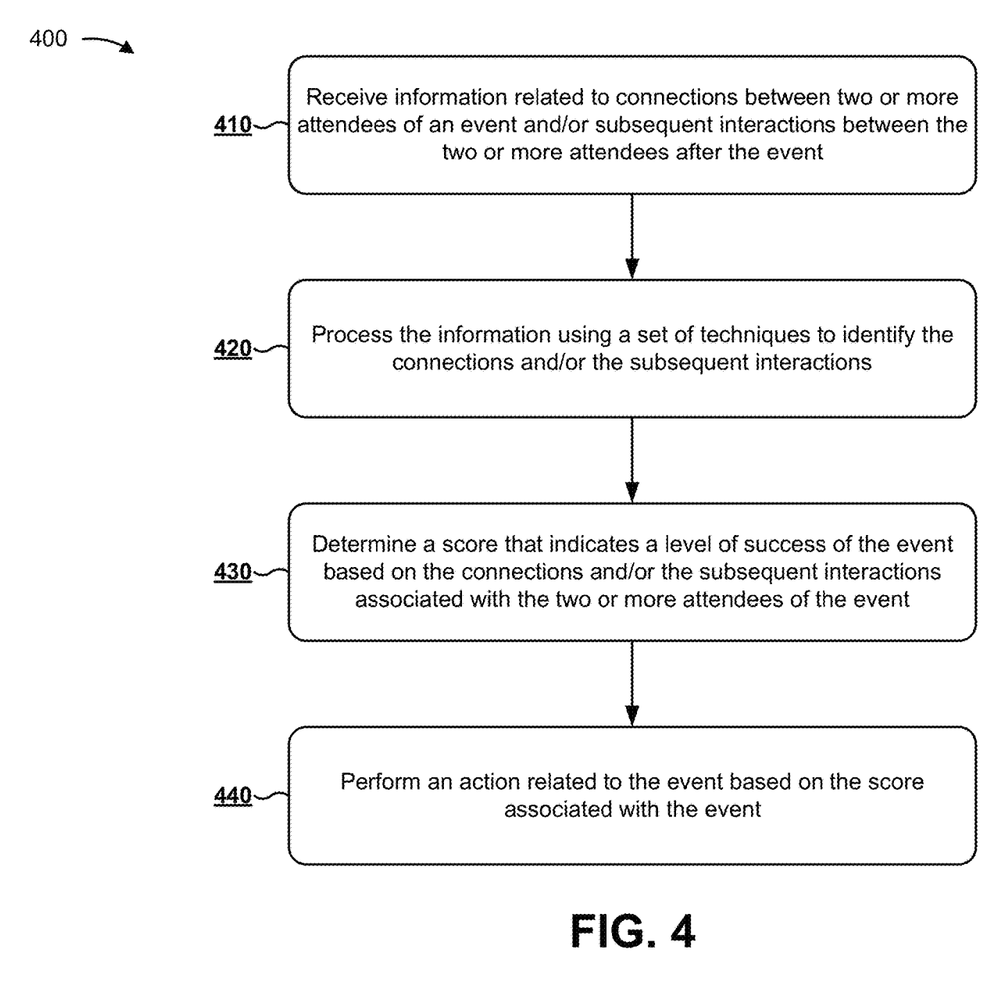
FIG. 4 is a flow chart of an example process for analyzing event-associated connections.

FIG. 4 is a flow chart of an example process 400 for analyzing event-associated connections. In some implementations, one or more process blocks of FIG. 4 may be performed by networking analysis platform 230. In some implementations, one or more process blocks of FIG. 4 may be performed by another device or a group of devices separate from or including networking analysis platform 230, such as client device 210 and/or server device 220.

As shown in FIG. 4, process 400 may include receiving information related to connections between two or more attendees of an event and/or subsequent interactions between the two or more attendees after the event (block 410). For example, networking analysis platform 230 may receive information related to connections between two or more attendees of an event and/or subsequent interactions between the two or more attendees after the event. In some implementations, the event may include a networking event, a conference, a meeting, and/or the like.

In some implementations, networking analysis platform 230 may receive the information periodically, according to a schedule, based on requesting the information, based on input from a user of client device 210, and/or the like. In some implementations, when receiving the information, networking analysis platform 230 may receive thousands, millions, billions, etc. of data elements. In this way, networking analysis platform 230 may receive a data set that cannot be processed manually or objectively by a human actor.

In some implementations, the information related to connections may identify contact information exchanged between users (of client devices 210) that attended an event (e.g., information identifying a name of a user, a phone number of a user, an email address of a user, a job title of a user, an employer of a user, etc.). Additionally, or alternatively, the information related to connections may identify whether users of client devices 210 that exchanged contact information have previously connected (e.g., whether client devices 210 associated with the users have previously exchanged information at an earlier date, at another event, etc.). Additionally, or alternatively, the information related to connections may identify an event at which users connected (e.g., at which client devices 210 associated with the users exchanged contact information). In some implementations, networking analysis platform 230 may receive the information related to the connections from client device 210 and/or server device 220.

In some implementations, the information related to subsequent interactions may identify whether users of client devices 210, that have exchanged information, have exchanged email messages after exchanging contact information (e.g., have exchanged emails after the event), have exchanged instant messages after exchanging contact information, have had a video call after exchanging contact information, have connected on social media after exchanging contact information, and/or the like. Additionally, or alternatively, the information related to subsequent interactions may identify the content of subsequent interactions (e.g., the content of emails, instant messages, video calls, etc.), such as to permit networking analysis platform 230 to determine a nature of the subsequent interactions (e.g., personal, business, etc.). In some implementations, networking analysis platform 230 may receive the information related to a subsequent interaction from client device 210 and/or server device 220.

In some implementations, networking analysis platform 230 may receive the information related to connections and/or subsequent interactions from client device 210 and/or server device 220 associated with the same organization as networking analysis platform 230. Additionally, or alternatively, networking analysis platform 230 may receive the information related to the connections and/or the subsequent interactions from client device 210 and/or server device 220 not associated with the same organization as networking analysis platform 230. For example, networking analysis platform 230 may receive the information when users opt in to providing the information to networking analysis platform 230. In some implementations, data that networking analysis platform 230 gathers may be anonymized, redacted, encrypted, and/or the like to protect personal user information.

In this way, networking analysis platform 230 may receive information related to connections between two or more attendees of an event and/or subsequent interactions between the two or more individuals after the event, to permit networking analysis platform 230 to process the information using a set of techniques.

As further shown in FIG. 4, process 400 may include processing the information using a set of techniques to identify the connections and/or the subsequent interactions (block 420). For example, networking analysis platform 230 may process the information using a set of techniques to identify the connections and/or the subsequent interactions.

In some implementations, networking analysis platform 230 may process thousands, millions, billions, etc. of data elements when processing the information. In this way, networking analysis platform 230 may process a data set that cannot be processed manually or objectively by a human actor.

In some implementations, networking analysis platform 230 may process text data using a technique. For example, networking analysis platform 230 may process text data using a text processing technique, such as natural language processing technique, a text analysis technique, a computational linguistics technique, and/or the like, to identify a term and/or phrase included in the text. Continuing with the previous example, a term and/or phrase may identify information related to a connection between two or more individuals, information related to a subsequent interaction between the two or more individuals, a nature of a subsequent interaction, and/or the like. This permits networking analysis platform 230 to quickly and efficiently process information when analyzing the information, thereby conserving processing resources of networking analysis platform 230.

Additionally, or alternatively, networking analysis platform 230 may process audio data using a technique. For example, networking analysis platform 230 may process audio data using an audio processing technique, such as a speech-to-text technique, an automatic speech recognition technique, and/or the like, to identify a term and/or phrase included in audio data. Continuing with the previous example, a term and/or phrase may identify information related to a connection between two or more individuals, information related to a subsequent interaction between two or more individuals, a nature of a subsequent interaction, and/or the like. This permits networking analysis platform 230 to quickly and efficiently process information when analyzing the information, thereby conserving processing resources of networking analysis platform 230.

Additionally, or alternatively, networking analysis platform 230 may process video data using a video processing technique, such as a computer vision technique, a motion detection technique, a feature extraction technique, a shape detection technique, and/or the like. Continuing with the previous example, networking analysis platform 230 may process video data to identify an object shown in video data, text in video data (e.g., of a presentation), and/or the like. This permits networking analysis platform 230 to quickly and efficiently process information when analyzing the information, thereby conserving processing resources of networking analysis platform 230.

In this way, networking analysis platform 230 may process the information using a set of techniques to identify the connections and/or the subsequent interactions, to permit networking analysis platform 230 to determine a score that indicates a level of success of the event.

As further shown in FIG. 4, process 400 may include determining a score that indicates a level of success of the event based on the connections and/or the subsequent interactions associated with the two or more attendees of the event (block 430). For example, networking analysis platform 230 may determine a score that indicates a level of success of the event based on the connections and/or the subsequent interactions associated with the two or more attendees of the event.

In some implementations, networking analysis platform 230 may determine a score based on whether two or more attendees have previously exchanged contact information. For example, networking analysis platform 230 may determine whether two or more attendees have previously exchanged contact information at an earlier date (e.g., using information that identifies existing contacts of the two or more attendees) and may determine to increase a score associated with an event by a threshold amount when two or more attendees that exchanged contact information at the event have not previously exchanged contact information. Additionally, or alternatively, and as another example, networking analysis platform 230 may determine whether a threshold quantity of attendees exchanged contact information at the event and may determine to increase a score associated with an event by a threshold amount when the threshold quantity of attendees is satisfied.

Additionally, or alternatively, networking analysis platform 230 may determine a score based on whether two or more attendees who use client devices 210 to exchange contact information have a subsequent interaction (e.g., after exchanging contact information, after the event, etc.), a timing of a subsequent interaction, a type of subsequent interaction, whether a first type of subsequent interaction is related to another type of subsequent interaction, a quantity of subsequent interactions, and/or the like. For example, networking analysis platform 230 may determine whether a subsequent interaction occurs between two or more attendees who exchanged contact information at the event (e.g., using client devices 210) within a threshold amount of time of the event and/or within a threshold amount of time of exchanging contact information (e.g., within one week, two weeks, one day, one month, etc. of the event and/or exchanging contact information). Continuing with the previous example, networking analysis platform 230 may determine to increase the score by a threshold amount when a timing of a subsequent interaction satisfies a threshold or may determine to decrease the score by a threshold amount when a timing of a subsequent interaction fails to satisfy a threshold and/or when two or more attendees that exchanged contact information fail to have a subsequent interaction.

Additionally, or alternatively, and as another example, networking analysis platform 230 may determine whether a subsequent interaction is a particular type of interaction, such as an email exchange, a telephone call, a video call, an instant message, a connection on social media, and/or the like. Continuing with the previous example, networking analysis platform 230 may determine to increment a score by a threshold amount when a subsequent interaction is a particular type of interaction.

Additionally, or alternatively, and as another example, networking analysis platform 230 may determine whether a first type of subsequent interaction (e.g., an email exchange) is related to another type of subsequent interaction (e.g., a telephone call). Continuing with the previous example, networking analysis platform 230 may analyze the content of an email exchange between two attendees to determine that the two attendees have scheduled a telephone call and may determine that the two attendees did have the telephone call based on information related to subsequent interactions of the two attendees. Continuing still with the previous example, networking analysis platform 230 may determine to increase the score by a threshold amount based on the email exchange being related to a subsequent telephone call.

Additionally, or alternatively, networking analysis platform 230 may determine a score based on whether connections associated with the event are related to other connections. Continuing with the previous example, networking analysis platform 230 may determine whether a connection between two attendees of the event is related to other connections between the two attendees and other individuals (e.g., where a first attendee provides contact information of another individual to a second attendee with which the first attendee exchanged contact information at the event). Continuing still with the previous example, networking analysis platform 230 may determine to increase the score by a threshold amount based on the first attendee providing contact information for the other individual to the second attendee (e.g., referring the second attendee to the other individual). In some implementations, networking analysis platform 230 may determine a score based on a quantity of connections associated with the event that are related to other connections (e.g., based on the quantity of connections satisfying a threshold).

Additionally, or alternatively, networking analysis platform 230 may determine a score based on the content and/or nature of subsequent interactions. For example, networking analysis platform 230 may analyze identified terms and/or phrases associated with content of subsequent interactions to determine the content and/or nature of subsequent interactions. Continuing with the previous example, networking analysis platform 230 may determine whether a subsequent interaction is a social interaction, a business-related interaction, and/or the like. In some implementations, networking analysis platform 230 may determine to increase or decrease a score by a threshold amount based on the content and/or nature of subsequent interactions.

In some implementations, a threshold score may indicate a level of success of an event. For example, a threshold score may indicate an event's success with respect to connections resulting from the event, subsequent interactions of individuals who connected at the event, the content and/or nature of subsequent interactions, whether an event satisfies a goal for attendees of the event (e.g., a goal related to a quantity of connections formed, subsequent interactions of attendees, etc.), and/or the like.

In some implementations, networking analysis platform 230 may determine a score for an attendee of the event in a manner similar to that described above with respect to determining a score associated with an event. For example, networking analysis platform 230 may determine a score for an attendee based on a quantity of connections that the attendee forms at the event (e.g., a quantity of attendees with which the attendee exchanged contact information), may determine a score based on a quantity and/or type of subsequent interactions that the attendee has with other attendees, may determine a score based on a quantity of other individuals that the attendee introduces to other attendees and/or to which the attendee is introduced, and/or the like. In some implementations, a score for an attendee may indicate a level of success of the event with respect to the attendee.

In some implementations, networking analysis platform 230 may use other data to determine a score and/or a level of success. For example, networking analysis platform 230 may use data related to a level of exposure at an event for an organization (e.g., a quantity of people that were sent to an event, an amount of marketing that was performed by the organization, etc.), a size of the event (e.g., in terms of a total number of attendees), the number of targets of an organization (e.g., people, companies, etc.) present at the event (e.g., as determined from an attendee list), the reputation of the organization hosting the event (e.g., as determined from input from client device 210, processing reviews of the organization, etc.), the quality of the subject matter or presenters at the event (e.g., as determined by processing reviews of the presenters, by processing resumes of the presenters, etc.), the length of time of the event, the venue of the event (e.g., a city, a hotel, etc.), a score of a related event (e.g., hosted by the same organization, the same event in a prior year, an event that is similar to the event being analyzed in terms of size, subject matter, and/or the like, etc.), the attendees (e.g., that an organization sent to the event) to permit identification of who to send to a future event and/or why an event was successful or unsuccessful, and/or the like.

In some implementations, when determining a score and/or a level of success for an event, networking analysis platform 230 may generate a model and/or use machine learning, artificial intelligence, and/or the like. For example, networking analysis platform 230 may have been trained on data that identifies scores and/or levels of success for events and/or individuals. In some implementations, networking analysis platform 230 may then identify a score and/or level of success for an event and/or individual based on being trained. Additionally, or alternatively, and as another example, data from a first networking analysis platform 230 may be used to update a model for use with a second networking analysis platform 230 (e.g., where the first networking analysis platform 230 and the second networking analysis platform 230 are associated with different organizations). In this way, networking analysis platform 230 may be trained to determine a score and/or a level of success for an event and/or an individual.

In this way, networking analysis platform 230 may determine a score that indicates a level of success of the event based on the connections and/or the subsequent interactions, to permit and/or cause networking analysis platform 230 to perform an action related to the event.

As further shown in FIG. 4, process 400 may include performing an action related to the event based on the score associated with the event (block 440). For example, networking analysis platform 230 may perform an action related to the event based on the score associated with the event.

In some implementations, networking analysis platform 230 may identify events and/or attendees associated with a threshold score (e.g., to permit identification of events and/or attendees associated with a threshold level of success for an event). Additionally, or alternatively, networking analysis platform 230 may generate a report that identifies events and/or attendees associated with a threshold score and may provide the report for display and/or may output the report.

Additionally, or alternatively, networking analysis platform 230 may analyze data related to an event and/or an attendee associated with a threshold score using machine learning, artificial intelligence, and/or the like to identify characteristics of an event that cause the event and/or the attendee to be associated with a threshold score. For example, networking analysis platform 230 may use a result of analyzing data related to an event and/or an attendee to analyze data related to other events and/or individuals to predict which events and/or individuals are likely to be associated with threshold scores. Continuing with the previous example, networking analysis platform 230 may generate a report that identifies which events and/or attendees are likely to be associated with threshold scores.

Additionally, or alternatively, networking analysis platform 230 may output a generated report for display (e.g., via client device 210). Additionally, or alternatively, networking analysis platform 230 may send a message for display (e.g., to client device 210 associated with a manager of an event and/or an attendee). For example, the message may include information that identifies a result of determining a level of success associated with an event and/or an attendee. Additionally, or alternatively, networking analysis platform 230 may schedule a meeting such as to discuss a level of success of a set of events and/or scores associated with a set of attendees.

Additionally, or alternatively, networking analysis platform 230 may generate a recommendation. For example, networking analysis platform 230 may generate a recommendation to attend the same or similar events as an analyzed event in the future, to have particular individuals attend future events, to host similar types of events in the future, and/or the like. In some implementations, networking analysis platform 230 may provide information for display that identifies a generated recommendation.

Additionally, or alternatively, and as another example, networking analysis platform 230 may generate a recommendation to increase exposure at a future event that is predicted to be successful (e.g., to increase marketing at the event, to increase a quantity of attendees, etc.). Additionally, or alternatively, and as another example, networking analysis platform 230 may generate a recommendation related to a set of employees to send to a future event (e.g., different employees may be predicted to be successful at different events). Additionally, or alternatively, networking analysis platform 230 may generate a recommendation related to a manner in which attendees should engage other attendees at a future event (e.g., engage attendees with particular demographics, particular types of organizations, etc.).

In this way, networking analysis platform 230 may perform an action related to the event based on the score associated with the event.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
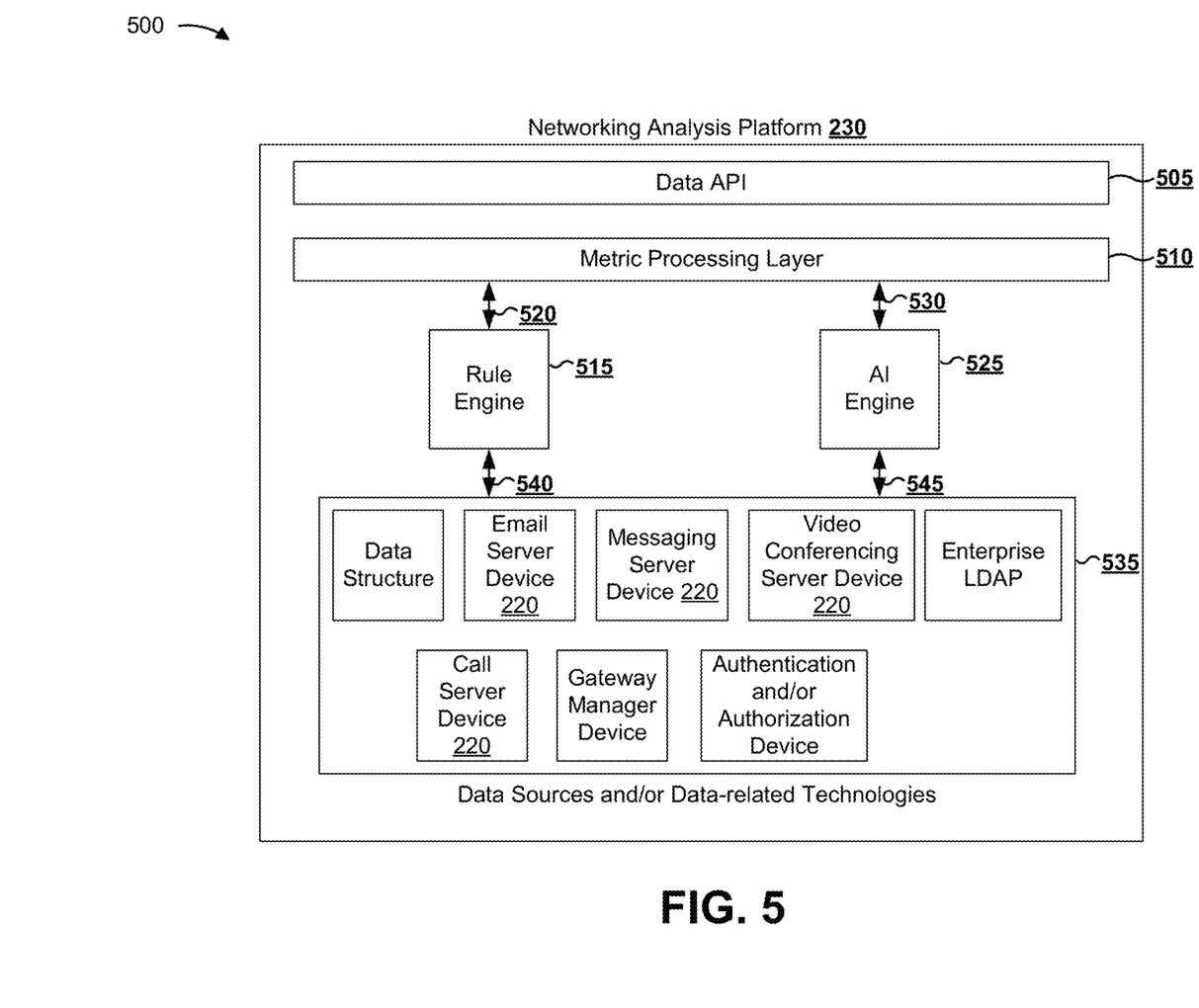
FIG. 5 is a diagram of an example implementation relating to the example process shown in FIG. 4.

FIG. 5 is a diagram of an example implementation 500 relating to example process 400 shown in FIG. 4. FIG. 5 shows an example of a system architecture associated with networking analysis platform 230.

As shown in FIG. 5, and by reference number 505, networking analysis platform 230 may include a data application programming interface (API). For example, the data API may permit networking analysis platform 230 to receive information related to client devices 210 that exchange contact information, subsequent interactions of users of client devices 210 that exchange contact information, and/or the like. As shown by reference number 510, networking analysis platform 230 may include a metric processing layer. For example, the metric processing layer may process information related to connections and/or subsequent interactions to determine values for metrics and/or whether the values for the metrics satisfy a threshold.

As shown by reference number 515, networking analysis platform 230 may include a rule engine. For example, the rule engine may store information that identifies rules to be used to process data (e.g., to determine a level of success of an event). As shown by reference number 520, the rule engine may communicate with the metric processing layer to provide information that identifies the set of rules to the metric processing layer to permit the information identifying the set of rules to be used when determining values for metrics. As shown by reference number 525, networking analysis platform 230 may include an artificial intelligence (AI) engine. For example, the AI engine may use information identifying the rules to determine whether the rules are satisfied, whether values for metrics satisfy a threshold, and/or the like. As shown by reference number 530, the AI engine may communicate with the metric processing layer to determine whether values for metrics satisfy a set of rules, to analyze values for metrics (e.g., patterns among the values), and/or the like.

As shown by reference number 535, networking analysis platform 230 may include a set of data sources and/or data-related technologies. For example, networking analysis platform 230 may include a data structure to store information related to an event and/or a result of analyzing information related to an event, an email server device 220 to store information related to subsequent email interactions, a messaging server device 220 to store information related to subsequent instant message, text message, and/or the like interactions, a video conferencing server device 220 to store information related to subsequent video conference interactions, enterprise lightweight directory access protocol (LDAP) to permit location of and/or access to information related to an event and/or a subsequent interaction, a call server device 220 to store information related to subsequent telephone call interactions, a gateway manager device to permit networking analysis platform 230 to communicate with devices connected to a different network 240 than networking analysis platform 230, an authentication and/or authorization device to control access to networking analysis platform 230, data related to an event, and/or the like. As shown by reference numbers 540 and 545, the data sources and/or data-related technologies may communicate with and/or permit communication with the rule engine and/or the AI engine.

As indicated above, FIG. 5 is provided merely as an example. Other examples are possible and may differ from what was described with regard to FIG. 5.

Some implementations, described herein, provide a networking analysis platform that is capable of automatically processing data related to connections made among attendees of an event. In this way, the networking analysis platform may determine a level of success of the event with respect to generating connections among attendees of the event, generating potential customer or partner leads among attendees of the event, and/or the like. This conserves processing resources by increasing an efficiency of processing data related to an event to determine the level of success of the event relative to using other processing resources that cannot process the data as efficiently. In addition, this improves an accuracy of assessing a level of success of an event relative to using another technique such as a manual assessment, merely relying on statements from employees that attended the event to determine a level of success of the event, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive, from at least one of a client device or a server device, information related to connections between two or more attendees of an event or subsequent interactions between the two or more attendees after the event,
         the information including contact information associated with the two or more attendees;
      process the information using a set of computer processing techniques to identify the connections or the subsequent interactions,
         the set of computer processing techniques including:
            a text processing technique, or
            an audio data processing technique;
      determine, based on analyzing the information using a machine learning model and based on the connections or the subsequent interactions associated with the two or more attendees of the event, a score related to the event,
         the score indicating a level of success of the event, and
         the machine learning model being trained on data identifying other scores indicating other levels of success of other events; and
      perform an action related to the event based on the score,
         where the one or more processors, when performing the action, are to:
            generate, based on the score, a prediction regarding a second score indicating a second level of success of a second event, and
            generate, based on the second score satisfying a threshold score, a recommendation regarding participation in the second event.

2. The device of claim 1, where the one or more processors are further to:
   determine whether the two or more attendees have previously exchanged the contact information; and
   where the one or more processors, when determining the score, are to:
      determine the score based on whether the two or more attendees have previously exchanged the contact information.

3. The device of claim 1, where the one or more processors are further to:
   identify a set of events associated with the threshold score after determining the score for the event; and
   where the one or more processors, when performing the action, are to:
      generate a report that identifies the set of events; and
      output the report for display after generating the report.

4. The device of claim 1, where the one or more processors are further to:
   determine whether a first type of subsequent interaction, included in the subsequent interactions, is related to a second type of subsequent interaction included in the subsequent interactions; and
   where the one or more processors, when determining the score, are to:
      determine the score based on whether the first type of subsequent interaction is related to the second type of subsequent interaction.

5. The device of claim 1, where the set of computer processing techniques are related to processing text data, and
where the set of computer processing techniques includes:
a natural language processing technique,
a text analysis technique, or
a computational linguistics technique.

6. The device of claim 1, where the set of computer processing techniques are related to processing audio data, and
where the set of computer processing techniques includes:
a speech-to-text technique,
a computer speech recognition technique, or
an automatic speech recognition technique.

7. The device of claim 1, where the one or more processors, when processing the information, are to:
determine that the information includes at least one term; and
identify the connections or the subsequent interactions based on determining that the information includes the at least one term.

8. A method, comprising:
receiving, by a device and from at least one of a client device or a server device, information related to an event,
the information relating to:
connections between two or more attendees of the event that exchanged contact information at the event, or
subsequent interactions between the two or more attendees after exchanging the contact information;
processing, by the device, the information using a set of computer processing techniques to identify the connections or the subsequent interactions;
determining, by the device and based on analyzing the information using a machine learning model, a score related to the event that indicates a level of success of the event with respect to the connections or the subsequent interactions,
the score being determined using the information related to the connections or the subsequent interactions, and
the machine learning model being trained on data identifying other scores indicating other levels of success of other events; and
performing, by the device, an action related to the event based on the score,
wherein performing the action comprises:
generating, based on the score, a prediction regarding a second score indicating a second level of success of a second event, and
generating, based on the second score satisfying a threshold score, a recommendation regarding participation in the second event.

9. The method of claim 8, further comprising:
determining whether the two or more attendees have previously exchanged the contact information or a timing of a prior exchange of the contact information; and
where determining the score comprises:
determining the score based on whether the two or more attendees have previously exchanged the contact information or the timing of the prior exchange of the contact information.

10. The method of claim 8, where performing the action comprises:
generating another recommendation related to a set of future events to which to send an attendee, of the two or more attendees, or another individual based on the score.

11. The method of claim 8, further comprising:
determining a content or a nature of the subsequent interactions of the two or more attendees; and
where determining the score comprises:
determining the score based on the content or the nature of the subsequent interactions.

12. The method of claim 8, where determining the score comprises:
determining the score based on whether the two or more attendees have previously exchanged the contact information.

13. The method of claim 8, further comprising:
determining whether a connection, of the connections, is related to another connection; and
where determining the score comprises:
determining the score based on whether the connection is related to another connection.

14. The method of claim 8, where performing the action comprises:
scheduling a meeting related to the event or an attendee, of the two or more attendees, after determining the score.

15. A non-transitory computer-readable medium storing instructions, the instructions comprising:
one or more instructions that, when executed by one or more processors, cause the one or more processors to:
receive information related to connections between two or more attendees of an event or subsequent interactions between the two or more attendees,
the information being received from:
a client device associated with one of the two or more attendees, or
a server device;
process the information using a set of computer processing techniques to permit an analysis of the connections and the subsequent interactions;
determine, based on analyzing the information using a machine learning model and based on the connections and the subsequent interactions, a score related to the event,
the score indicating a level of success of the event with respect to the connections or the subsequent interactions, and
the machine learning model being trained on data identifying other scores indicating other levels of success of other events; and
perform an action based on the score,
where the one or more instructions, that cause the one or more processors to perform the action, cause the one or more processors to:
generate, based on the score, a prediction regarding a second score indicating a second level of success of a second event, and
generate, based on the second score satisfying a threshold score, a recommendation regarding participation in the second event.

16. The non-transitory computer-readable medium of claim 15, where the one or more instructions, when executed by the one or more processors, further cause the one or more processors to:
determine whether a subsequent interaction, of the subsequent interactions, is a particular type of subsequent interaction; and where the one or more instructions, that cause the one or more processors to determine the score, cause the one or more processors to:
  determine the score based on whether the subsequent interaction is the particular type of subsequent interaction.

17. The non-transitory computer-readable medium of claim 15, where the one or more instructions, when executed by the one or more processors, further cause the one or more processors to:
  determine whether the two or more attendees had a subsequent interaction;
  determine a timing of the subsequent interaction after determining that the two or more attendees had the subsequent interaction; and
  where the one or more instructions, that cause the one or more processors to determine the score, cause the one or more processors to:
    determine the score based on whether the two or more attendees had the subsequent interaction or the timing of the subsequent interaction.

18. The non-transitory computer-readable medium of claim 15, where the one or more instructions, that cause the one or more processors to process the information, cause the one or more processors to:
  process the information to identify a term or phrase included in the information; and
  where the one or more instructions, when executed by the one or more processors, further cause the one or more processors to:
    identify the connections or the subsequent interactions after identifying the term or phrase included in the information.

19. The non-transitory computer-readable medium of claim 15, where the one or more instructions, when executed by the one or more processors, further cause the one or more processors to:
  generate another recommendation related to whether to have an attendee, of the two or more attendees, attend the second event; and
  where the one or more instructions, that cause the one or more processors to perform the action, cause the one or more processors to:
    provide information identifying the recommendation for display after generating the recommendation.

20. The non-transitory computer-readable medium of claim 15, where the information comprises:
  social media network information indicating that the connections between the two or more attendees are on a social media network.

* * * * *